(12) United States Patent
Konishiike et al.

(10) Patent No.: US 7,700,235 B2
(45) Date of Patent: Apr. 20, 2010

(54) BATTERY AND METHOD OF MANUFACTURING THE SAME

(75) Inventors: Isamu Konishiike, Fukushima (JP); Kenichi Kawase, Fukushima (JP); Kensuke Yamamoto, Fukushima (JP); Yukiko Iijima, Fukushima (JP); Tomoo Takada, Fukushima (JP); Takakazu Hirose, Fukushima (JP)

(73) Assignee: Sony Corporation, Tokyo (JP)

( * ) Notice: Subject to any disclaimer, the term of this patent is extended or adjusted under 35 U.S.C. 154(b) by 857 days.

(21) Appl. No.: 11/282,231

(22) Filed: Nov. 18, 2005

(65) Prior Publication Data

US 2007/0207386 A1 Sep. 6, 2007

(30) Foreign Application Priority Data

Nov. 25, 2004 (JP) ............... P2004-341181
Nov. 25, 2004 (JP) ............... P2004-341182

(51) Int. Cl.
*H01M 4/48* (2006.01)
*H01M 4/02* (2006.01)

(52) U.S. Cl. .................... 429/218.1; 429/209
(58) Field of Classification Search ............... 252/521.3
See application file for complete search history.

(56) References Cited

U.S. PATENT DOCUMENTS

| 6,432,579 | B1 | 8/2002 | Tsuji et al. | |
|---|---|---|---|---|
| 6,921,463 | B2 | 7/2005 | Sayama et al. | |
| 7,160,646 | B2 * | 1/2007 | Ohshita et al. | 429/218.1 |
| 2004/0175621 | A1 * | 9/2004 | Iriyama et al. | 429/231.95 |

FOREIGN PATENT DOCUMENTS

| JP | 06-187994 | 7/1994 |
|---|---|---|
| JP | 8050922 | 2/1996 |
| JP | 11135115 | 5/1999 |
| JP | 2948205 | 7/1999 |
| JP | 11339777 | 12/1999 |
| JP | 2002-075350 | 3/2002 |
| JP | 2002083594 | 3/2002 |
| JP | 2002-170557 | 6/2002 |
| JP | 2003-007288 | 1/2003 |
| JP | 2005-183365 | 7/2005 |
| JP | 2005-196970 | 7/2005 |
| WO | 01/29912 | 4/2001 |
| WO | 01/31721 | 5/2001 |

OTHER PUBLICATIONS

T. Yoshida et al., "Electrochemical properties of Si Thin film anode for lithium secondary batteries," Summary of Autumn Meeting of the Electrochemical Society of Japan, 3 pages, 2002.
Fujitani, et al., New a-Si Alloy Thin Film Anode with Self Organized Micro Columnar Structure, published prior to Nov. 25, 2004.

* cited by examiner

*Primary Examiner*—Dah-Wei D Yuan
*Assistant Examiner*—Maria J Laios
(74) *Attorney, Agent, or Firm*—K&L Gates LLP

(57) ABSTRACT

A battery capable of improving cycle characteristics is provided. An anode active material layer is formed by a vapor phase method, and includes Si as an element. In the anode active material layer, a plurality of primary particles formed by growth in a thickness direction are included, and the plurality of primary particles are agglomerated to form a plurality of secondary particles. Each secondary particle is separated by a groove formed by charge and discharge, and some of primary particles are split particles split by the groove. The average number of the split particles per secondary particle in 5 or more adjacent secondary particles is 10 or more. Moreover, the primary particles and the secondary particles are inclined to the same side.

12 Claims, 12 Drawing Sheets

BATTERY AND METHOD OF MANUFACTURING THE SAME

CROSS REFERENCES TO RELATED APPLICATIONS

The present application claims priority to Japanese Patent Application JP 2004-341181 filed in the Japanese Patent Office on Nov. 25, 2004, and Japanese Patent Application JP 2004-341182 filed in the Japanese Patent Office on Nov. 25, 2004, the entire contents of which are being incorporated herein by reference.

BACKGROUND

The present invention relates to a battery including an anode active material layer which includes silicon (Si) as an element, and a method of manufacturing the battery.

In recent years, as mobile devices have become more sophisticated and multifunctional, a demand for an increase in the capacity of secondary batteries as power sources for the mobile devices has been made. As a secondary battery which meets the demand, a lithium secondary battery is cited. However, in a currently typical lithium secondary battery which uses lithium cobalt oxide for a cathode and graphite for an anode, its battery capacity has reached the saturation point, so it is extremely difficult to significantly increase its capacity. Therefore, using metal lithium (Li) for an anode has been considered since a long time ago; however, in order to put the anode to practical use, it is necessary to improve lithium precipitation/dissolution efficiency and control dendritic evaporation.

On the other hand, in recent times, a study of an anode with high capacity which uses silicon, tin (Sn) or the like has been conducted vigorously. However, when charge and discharge are repeated, the anode with high capacity is broken into small pieces due to severe expansion and shrinkage of an active material, thereby a current collecting property declines, and the decomposition of an electrolyte solution is accelerated due to an increase in a surface area, so cycle characteristics are extremely poor. Therefore, an anode formed through forming an active material layer on a current collector by a vapor phase method, a liquid phase method, a firing method or the like has been studied (for example, refer to Japanese Unexamined Patent Application Publication No. H8-50922, Japanese Patent No. 2948205 and Japanese Unexamined Patent Application Publication No. H11-135115). The anode can be prevented from being broken into small pieces, compared to a coating type anode formed through applying slurry including a particulate active material, a binder and the like in a related art, and in the anode, a current collector and an active material layer can be formed as one unit. Therefore, the electronic conductivity in the anode is excellent, and higher performance in terms of capacity and cycle lifespan is expected. Moreover, an electrical conductor, a binder and voids which are present in an anode in a related art can be reduced or eliminated, so the anode can be formed into a thin film in essence. Further, it has been reported that the surface of the anode current collector is roughened so as to form microscopic asperities on the surface of the anode active material, thereby excellent characteristics can be obtained (for example, refer to Japanese Unexamined Patent Application Publication No. 2002-83594, S. Fujitani, H. Yagi, K. Sayama, T. Yoshida, H. Tarui, Sanyo Electric Co., Ltd., "The Electrochemical Society 203rd Meeting (Paris, France) Abstract 1152", (New a-Si Alloy Thin Film Anode with Self Organized Micro Columnar Structure), P. 1152, and "Summary of Autumn Meeting of the Electrochemical Society of Japan" 2002, p. 107).

However, in such an anode, for example, as described in S. Fujitani, H. Yagi, K. Sayama, T. Yoshida, H. Tarui, Sanyo Electric Co., Ltd., "The Electrochemical Society 203rd Meeting (Paris, France) Abstract 1152", (New a-Si Alloy Thin Film Anode with Self Organized Micro Columnar Structure), P. 1152, in an anode active material layer, individual primary particles which grow long and thin in a thickness direction repeatedly expands and shrinks by charge and discharge, so in the early stages of cycles, relatively good characteristics can be obtained; however, when the cycles are repeated, the anode active material layer may be damaged or fall off a current collector, thereby the characteristics decline.

Such a phenomenon often occurs in the case where the adhesion between primary particles is poor; however, when the adhesion between primary particles is strong, and thereby secondary particles become too large, the secondary particles may fall off according to charge and discharge, or a current collector may be damaged because it is difficult to release a stress by the expansion and shrinkage of the secondary particles. Therefore, it is difficult to obtain sufficient characteristics.

SUMMARY

In view of the forgoing, it is desirable to provide a battery capable of preventing an anode active material layer from losing its shape and capable of improving battery characteristics such as cycle characteristics, and a method of manufacturing the battery.

According to an embodiment of the present invention, there is provided a battery including: a cathode; an anode; and an electrolyte, wherein the anode includes an anode active material layer on an anode current collector, the anode active material layer including silicon as an element, the anode active material layer includes a plurality of secondary particles formed through agglomerating a plurality of primary particles, each secondary particle is separated by a groove with a depth in a thickness direction of the anode active material layer in an in-plane direction of the anode active material layer, some of the primary particles are split particles split by the groove, and at least in a part of the anode active material layer, the average number of the split particles per secondary particle in 5 or more adjacent secondary particles is 10 or more.

According to another embodiment of the present invention, there is provided a battery including: a cathode; an anode; and an electrolyte, wherein the anode includes an anode active material layer on an anode current collector, the anode active material layer including silicon as an element, the anode active material layer includes a plurality of secondary particles formed through agglomerating a plurality of primary particles, in the case where eight 100 μm-long lines with 10-μm pitches are drawn within a range of 100 μm×70 μm in at least a part of the anode active material layer, the average number of secondary particles per line is within a range from 5 to 11 inclusive, and the average number of primary particles per secondary particle on the line is 20 or more.

According to still another embodiment of the present invention, there is provided a battery including: a cathode; an anode; and an electrolyte, wherein the anode includes an anode active material layer on an anode current collector, the anode active material layer including silicon as an element, the anode active material layer includes a plurality of secondary particles formed through agglomerating a plurality of primary particles, and the primary particles and the secondary particles are inclined to the same side from a line perpendicular to the anode current collector in a section in a thickness direction.

According to an embodiment of the present invention, there is provided a method of manufacturing a battery, the battery including a cathode, an anode and an electrolyte, the method including the step of: forming an anode active material layer including silicon as an element on an anode current collector by evaporation at an evaporation speed of 40 nm/s or more.

In the battery according to the embodiment of invention, the average number of the split particles per secondary particle in 5 or more adjacent secondary particles is 10 or more, or in the battery according to another embodiment of the invention, the average number of secondary particles per line described above is within a range from 5 to 11 inclusive, and the average number of primary particles per secondary particle on the line is 20 or more, so the adhesion between the anode active material layer and the anode current collector can be improved, and the adhesion between the primary particles in the anode active material layer can be improved. Therefore, a stress due to expansion and shrinkage according to charge and discharge can be released, and the anode active material layer can be prevented from losing its shape and falling off the anode current collector. Thereby, battery characteristics such as cycle characteristics can be improved.

In particular, when the number ratio of secondary particles in which a length in a direction perpendicular to a thickness direction is longer than a length in the thickness direction is 50% or more in 10 successive secondary particles, or when the thickness of the anode active material layer at the time of discharge after repetition of the reference charge and discharge is 1.7 times or less as large as that at the time of discharge before the reference charge and discharge, higher effects can be obtained.

Moreover, when lithium is inserted into the anode active material layer before initial charge and discharge, or when electrochemically active lithium remains in the anode active material layer after discharge, a stress due to expansion and shrinkage according to charge and discharge can be further released, and the battery characteristics such as the cycle characteristics can be further improved.

In the battery according to still another embodiment of the invention, the primary particles and the secondary particles are inclined to the same side, so a stress due to expansion and shrinkage according to charge and discharge can be released, and the anode active material layer can be prevented from losing its shape and falling off the anode current collector. Therefore, the battery characteristics such as the cycle characteristics can be improved.

In particular, when the primary particles and the secondary particles are inclined at an angle ranging from 5° to 60° from a line perpendicular to the anode current collector, higher effects can be obtained.

In the method of manufacturing a battery according to the embodiment of the invention, the anode active material layer is formed by evaporation at an evaporation speed of 40 nm/s or more, so the adhesion between the anode active material layer and the anode current collector and the adhesion between the primary particles in the anode active material layer can be easily improved. Therefore, the battery according to the embodiment can be easily manufactured.

Additional features and advantages are described herein, and will be apparent from, the following Detailed Description and the figures.

DETAILED DESCRIPTION

Figure 1:
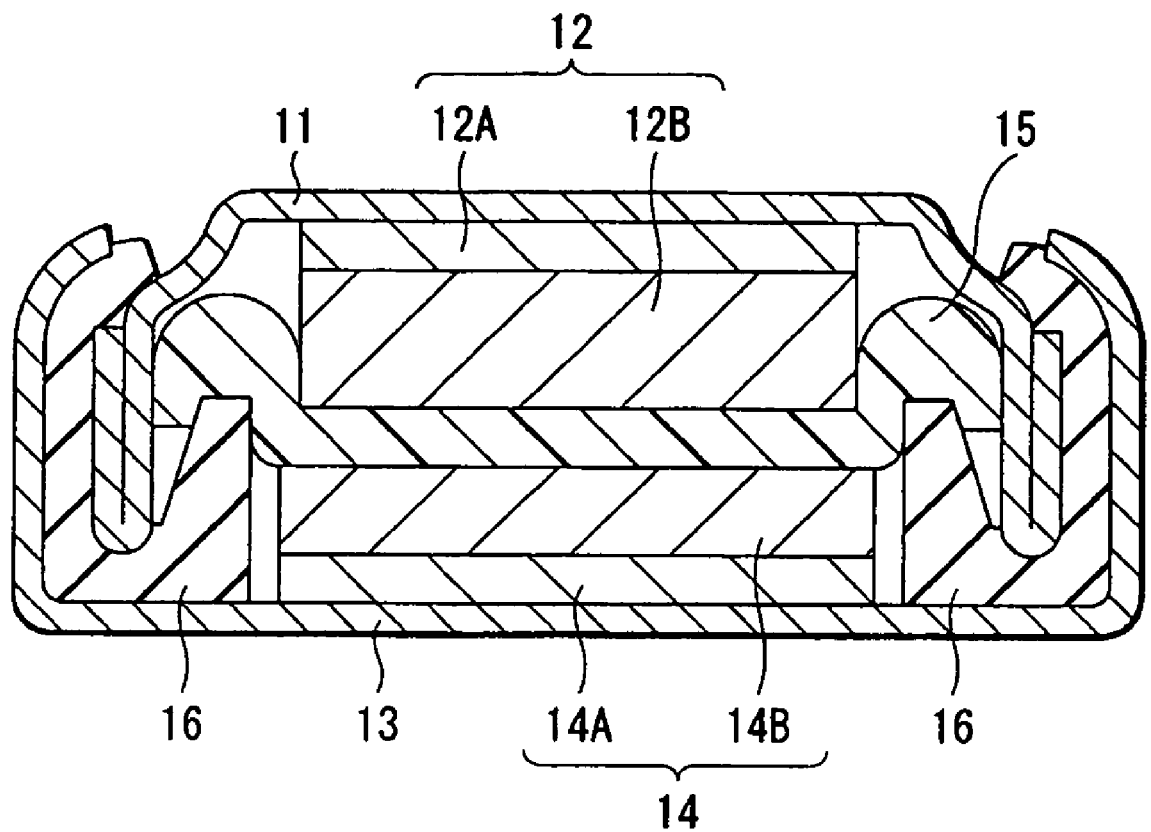
FIG. 1 is a sectional view of a secondary battery according to a first embodiment of the invention.

FIG. 1 shows the structure of a secondary battery according to a first embodiment of the invention. The secondary battery is a so-called coin type, and in the secondary battery, an anode 12 contained in a package cup 11 and a cathode 14 contained in a package can 13 are laminated with a separator 15 in between. The edge portions of the package cup 11 and the package can 13 are caulked by an insulating gasket 16 to seal the anode 12 and the cathode 14. The package cup 11 and the package can 13 are made of, for example, metal such as stainless or aluminum (Al).

The anode 12 includes, for example, an anode current collector 12A and an anode active material layer 12B disposed on the anode current collector 12A.

The anode current collector 12A is preferably made of a metal material including at least one kind of metal element which does not form an intermetallic compound with lithium. It is because when the metal material forms an intermetallic compound with lithium, the anode current collector 12A expands and shrinks according to charge and discharge, thereby structural damage to the anode current collector 12A occurs, so the current collecting property of the anode current collector 12A declines, and an ability of the anode current collector 12A to support the anode active material layer 12B is reduced. In the description, the metal material includes not only simple substances of metal elements but also an alloy including two or more kinds of metal elements and an alloy including one or more kinds of metal elements and one or more kinds of metalloid elements. Examples of the metal element which does not form an intermetallic compound with lithium include copper (Cu), nickel (Ni), titanium (Ti), iron (Fe) and chromium (Cr).

The anode current collector 12A preferably includes a metal element which is alloyed with the anode active material layer 12B, because when the metal element is alloyed with the anode active material layer 12B, the adhesion between the anode current collector 12A and the anode active material layer 12B can be improved. For example, as will be described later, in the case where the anode active material layer 12B includes silicon as an element, as a metal element which does not form an intermetallic compound with lithium, and is alloyed with the anode active material layer 12B, copper, nickel and iron is cited. They are preferable in terms of strength and conductivity.

The anode current collector 12A may include a single layer or a plurality of layers. In the case where the anode current collector 12A includes a plurality of layers, a layer in contact with the anode active material layer 12B is made of a metal material which is alloyed with silicon, and the other layers may be made of another metal material. Moreover, the anode current collector 12A is preferably made of a metal material including at least one kind of metal element which does not form an intermetallic compound with lithium except for an interface with the anode active material layer 12B.

The surface roughness of the anode current collector 12A is preferably 1 μm or more in ten point height of roughness profile Rz, and 0.15 μm or more in arithmetic mean roughness Ra, because the adhesion of the anode active material layer 12B can be improved.

The anode active material layer 12B includes silicon as an element, because silicon has a large ability to insert and extract lithium and can obtain a high energy density. Silicon may be included in the form of a simple substance, an alloy or a compound.

The anode active material layer 12B is formed by, for example, a vapor phase method, and includes a plurality of primary particles formed by growth in a thickness direction. A plurality of primary particles are agglomerated to form a plurality of secondary particles.

Figure 2:
FIG. 2 is a SEM photo showing a particle structure of an anode active material layer of the secondary battery shown in FIG. 1.
Figure 3:
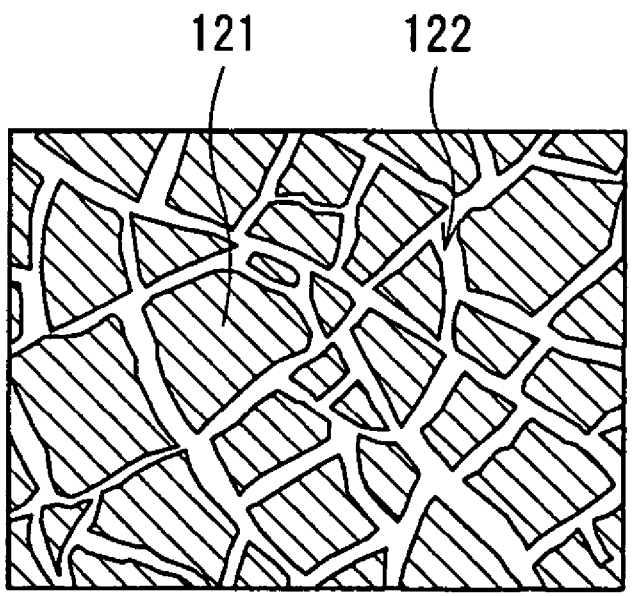
FIG. 3 is an illustration for describing the SEM photo shown in FIG. 2.
Figure 4:
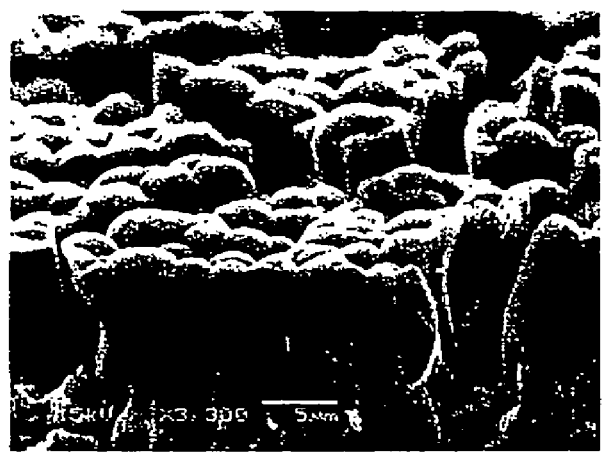
FIG. 4 is a SEM photo showing a sectional structure of the anode active material layer shown in FIG. 2.
Figure 5:
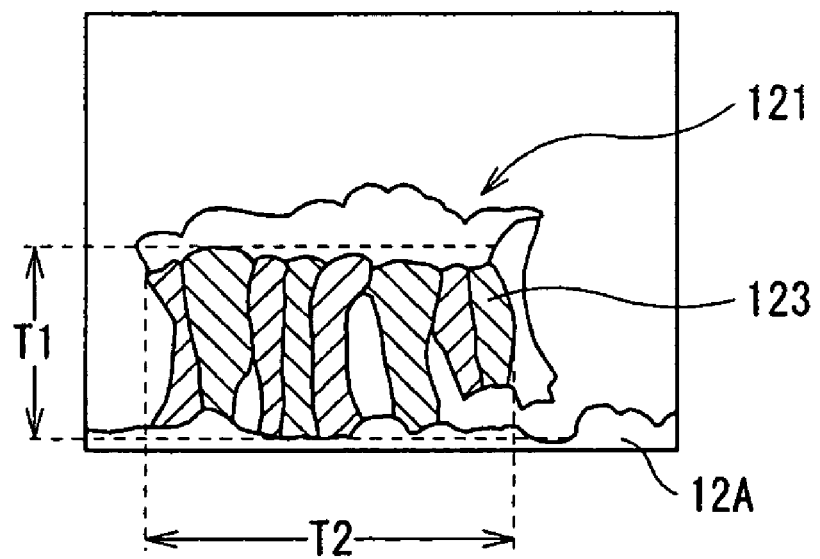
FIG. 5 is an illustration for describing the SEM photo shown in FIG. 4.
Figure 6:
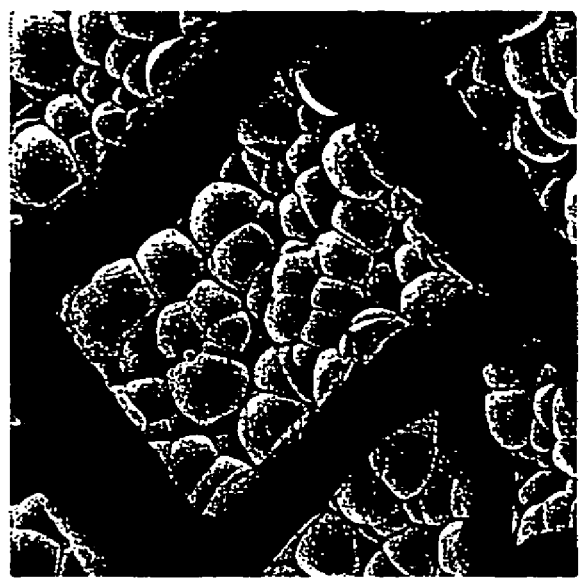
FIG. 6 is a SIM photo showing an enlarged part of the anode active material layer shown in FIG. 2.
Figure 7:
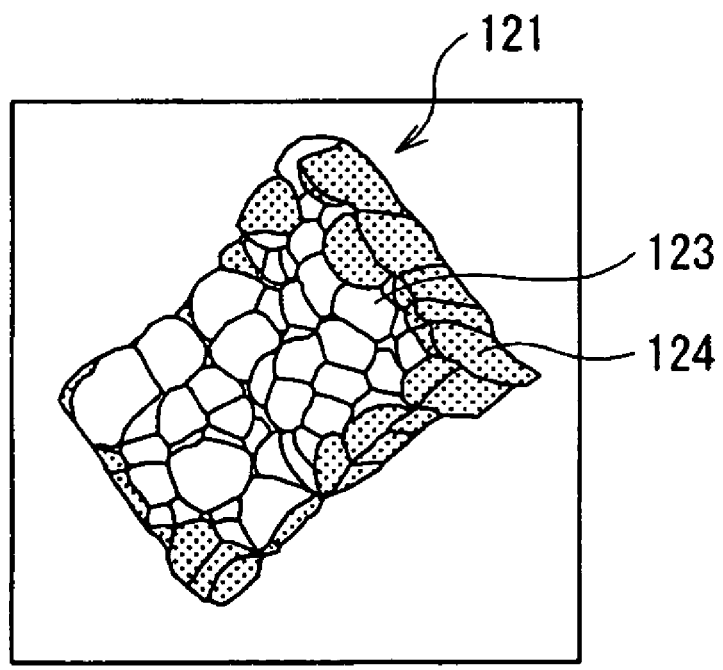
FIG. 7 is an illustration for describing the SIM photo shown in FIG. 6.

FIG. 2 is a scanning electron microscope (SEM) photo (secondary electron image) showing a particle structure of a surface of the anode active material layer 12B, and FIG. 3 is an illustration for describing FIG. 2. FIG. 4 is a SEM photo showing a section of the anode active material layer 12B shown in FIG. 2, and FIG. 5 is an illustration for describing FIG. 4. FIG. 6 is a scanning ion microscope (SIM) photo showing an enlarged part of FIG. 2, and FIG. 7 is an illustration for describing FIG. 6. In FIG. 2, each hatched region shown in FIG. 3 is each secondary particle 121, and in the secondary particle 121, each particle-like portion is each primary particle. Moreover, in FIG. 4, a hatched region in FIG. 5 is a section of a primary particle 123.

As shown in FIGS. 2 through 7, each secondary particle 121 is separated by a groove 122 with a depth in a thickness direction of the anode active material layer 12B in an in-plane direction of the anode active material layer 12B. Moreover, as shown in FIGS. 4 and 5, the primary particles 123 are not only adjacent to each other, but also partially bonded to one another so as to form the secondary particle 121, and the groove 122 nearly reaches the anode current collector 12A. For example, the depth of the groove 122 is approximately 5 μm or more, and the width of the groove 122 is, for example, approximately 1 μm or more. The groove 122 is formed by charge and discharge, and the groove 122 is formed not along primary particles but relatively linearly. Thereby, as shown in FIG. 6 under magnification, some of the primary particles are split particles 124 split by the groove 122. In FIG. 7, a knurled region is the split particle 124.

The average number of split particles 124 per secondary particle in 5 or more adjacent secondary particles is preferably 10 or more, because the primary particles 123 with a certain level of adhesion are bonded together to form the secondary particles 121 with a certain size or more, thereby a stress due to expansion and shrinkage according to charge discharge can be released. It is desirable to satisfy the average number of split particles 124 in a central portion of the anode 12, because currents are easily concentrated onto an edge portion, and variations in the formation of the groove 122 easily occur.

Moreover, as the size of the secondary particle 121, in the case where eight 100 μm-long lines with 10-μm pitches are drawn within a range of 100 μm×70 μm in a plane perpendicular to a thickness direction, the average number of secondary particles 121 per line is preferably within a range from 5 to 11 inclusive, and the average number of primary particles 123 per secondary particle 121 on the line is preferably 20 or more, because a stress due to expansion and shrinkage can be released by dividing into the secondary particles 121 with this size. The number of secondary particles 121 and the number of primary particles 123 may be satisfied in the central portion of the anode 12 as in the case of the above-described number of split particles 124. In the case where the width of the line is 1 μm, a secondary particle of which at least a part is laid on the line is included in the number of secondary particles existing on the line, and even if one secondary particle is laid over a plurality of lines, the secondary particle is included in each of the plurality of lines. Moreover, the split particles 124 are included in the number of primary particles included in the secondary particle.

Further, as the size of the secondary particle 121, in a section in a thickness direction shown in FIGS. 4 and 5, the number ratio of secondary particles in which a length T2 in a direction perpendicular to a thickness direction is longer than a length T1 in the thickness direction is preferably 50% or more in 10 successive secondary particles 121. It is because in this case, a stress can be further released. The number ratio may be satisfied in the central portion of the anode 12 as in the case of the above-described number of split particles 124. The maximum value of the length T1 in the thickness direction and the maximum value of the length T2 in a direction perpendicular to the thickness direction in the section of each secondary particle 121 are measured.

These particle structures may be observed, for example, by a SEM as shown in FIGS. 2 and 4, or a SIM as shown in FIG.

6. Moreover, the anode active material layer 12B is preferably cut by a focused ion beam (FB) or a microtome to observe the section.

In the secondary battery, the expansion of the anode active material layer 12B due to repetition of charge and discharge can be prevented by such a particle structure, and, for example, in the case where 40 cycles of charge and discharge is reference charge and discharge, the thickness of the anode active material layer 12B at the time of discharge after repetition of the reference charge and discharge is 1 to 1.7 times as large as that at the time of discharge before the reference charge and discharge. In this case, the reference charge and discharge are carried out on a battery which is charged and discharged at least once. However, the state of the anode active material layer 12B largely changes in early stages of charge and discharge, so the reference charge and discharge are preferably carried out on a battery which is charged and discharged 20 times or less after assembling the battery. The thickness of the anode active material layer 12B is an average value of the lengths T1 in a thickness direction in the sections of 10 successive secondary particles 121 in the central portion of the anode 12. The lengths T1 are measured as described above. For example, when the anode active material layer is disposed on both sides of the anode current collector, the lengths T1 in the thickness direction of 10 successive secondary particles 121 on each side are measured, and the average value of the lengths T1 is determined.

The anode active material layer 12B is preferably alloyed with the anode current collector 12A at least at a part of an interface with the anode current collector 12A. More specifically, it is preferable that an element of the anode current collector 12A is diffused into the anode active material layer 12B, or an element of the anode active material layer 12B is diffused into the anode current collector 12A, or they are diffused into each other at an interface therebetween, because even if the anode active material layer 12B expands and shrinks according to charge and discharge, the anode active material layer 12B can be prevented from falling off the anode current collector 12A.

Moreover, lithium is preferably inserted into the anode active material layer 12B in advance before initial charge and discharge. It is because a stress applied to the anode current collector 12A due to expansion and shrinkage can be further released, and lithium consumed by a reaction with an electrolyte solution can be added, and a rise in the potential of the anode 12 in late stages of discharge can be prevented. In this case, at least in early stages of a charge-discharge cycle, electrochemically active lithium preferably remains in the anode 12 after discharge.

Whether or not electrochemically active lithium remains in the anode 12 can be confirmed, for example, through disassembling the secondary battery after discharge to take out the anode 12, forming a half cell using metal foil or the like on which metal lithium can be deposited as a counter electrode, and checking whether or not lithium can be removed from the anode 12 and whether or not metal lithium can be deposited on the counter electrode.

The cathode 14 includes, for example, a cathode current collector 14A and a cathode active material layer 14B disposed on the cathode current collector 14A, and the cathode 14 is disposed so that the cathode active material layer 14B faces the anode active material layer 12B. The cathode current collector 14A is made of, for example, aluminum, nickel, stainless or the like.

The cathode active material layer 14B includes, for example, one kind or two or more kinds selected from cathode materials capable of inserting and extracting lithium as a cathode active material, and may include an electrical conductor such as a carbon material and a binder such as polyvinylidene fluoride, if necessary. As the cathode material capable of inserting and extracting lithium, for example, a lithium-containing metal complex oxide represented by a general formula $Li_xMIO_2$ is preferable, because as the lithium-containing metal complex oxide can generate a high voltage and has a high density, a higher capacity of the secondary battery can be achieved by the lithium-containing metal complex oxide. In the formula, MI represents one or more kinds of transition metals, and for example, at least one kind selected from the group consisting of cobalt (Co) and nickel is preferable as MI. The value of x depends upon a charge-discharge state of the battery, and is generally within a range of $0.05 \leq x \leq 1.10$. Specific examples of such a lithium-containing metal complex oxide include $LiCoO_2$, $LiNiO_2$ and the like.

The separator 15 isolates between the anode 12 and the cathode 14 to pass lithium ions through while preventing a short circuit of a current due to contact between the anode 12 and the cathode 14. The separator 15 is made of, for example, polyethylene or polypropylene.

The separator 15 is impregnated with an electrolyte solution which is a liquid electrolyte. The electrolyte solution includes, for example, a solvent and an electrolyte salt dissolved in the solvent, and may include various additives if necessary. As the solvent, for example, a nonaqueous solvent such as ethylene carbonate, propylene carbonate, dimethyl carbonate, diethyl carbonate or ethyl methyl carbonate is cited. One kind of solvent or a mixture of two or more kinds of solvents may be used.

As the electrolyte salt, for example, a lithium salt such as $LiPF_6$, $LiCF_3SO_3$ or $LiClO_4$ is cited. One kind of electrolyte salt or a mixture of two or more kinds of electrolyte salts may be used.

The battery can be manufactured through the following steps, for example.

At first, the anode active material layer 12B including silicon as an element is formed on the anode current collector 12A by, for example, a vapor phase method. As the vapor phase method, for example, a physical deposition method or a chemical deposition method is used, and more specifically, a vacuum evaporation method, a sputtering method, an ion plating method, a laser ablation method, a CVD (Chemical Vapor Deposition) method, a spraying method or the like can be used. After forming the anode active material layer 12B, a heat treatment is performed under a vacuum atmosphere or a non-oxidizing atmosphere. Thereby, alloying of the anode current collector 12A and the anode active material layer 12B can be performed, and the adhesion of the primary particles 123 can be improved, and the above-described particle structure can be formed by charge and discharge. Next, if necessary, lithium is electrochemically inserted into the anode active material layer 12B by, for example, a vacuum evaporation method. Lithium may be inserted before the heat treatment.

Next, the cathode active material layer 14B is formed on the cathode current collector 14A. For example, a cathode active material, and if necessary, an electrical conductor and a binder are mixed to form a mixture, and the mixture is applied to the cathode current collector 14A. Then, the mixture is compression molded to form the cathode active material layer 14B. After that, the anode 12, the separator 15 and the cathode 14 are laminated, and they are put into the package cup 11 and the package can 13, and an electrolyte solution is injected, and the package cup 11 and the package can 13 are caulked to assemble the battery. After assembling the battery, the battery is charged and discharged to form the above-described particle structure in the anode active material layer 12B.

Moreover, even in the case where the anode active material layer 12B is formed by an evaporation method at an evaporation speed of 40 nm/s or more, the above-described particle structure can be obtained. In this case, a heat treatment may or not be further performed after forming the anode active material layer 12B.

When the secondary battery is charged, lithium ions are extracted from the cathode 14, and are inserted into the anode 12 through the electrolyte solution. When the secondary battery is discharged, for example, the lithium ions are extracted from the anode 12, and are inserted into the cathode 14 through the electrolyte solution. The anode active material layer 12B largely expands and shrinks according to charge and discharge; however, the anode active material layer 12B has the above-described particle structure, so the primary particles 123 expand or shrink not individually but on a secondary particle 121 basis. Therefore, a stress can be released, and the anode active material layer 12B can be prevented from losing its shape and falling off the anode current collector 12A.

Thus, in the embodiment, in the anode active material layer 12B, the average number of split particles 124 per secondary particle in 5 or more adjacent secondary particles is 10 or more, or the average number of secondary particles 121 per line described above is within a range from 5 to 11 inclusive, and the average number of primary particles 123 per secondary particle 121 is 20 or more, so the adhesion between the anode active material layer 12B and the anode current collector 12A and the adhesion between the primary particles 123 in the anode active material layer 12B can be improved. Therefore, a stress due to expansion and shrinkage according to charge and discharge can be released, and the anode active material layer 12B can be prevented from losing its shape and falling off the anode current collector 12A. Therefore, battery characteristics such as cycle characteristics can be improved.

In particular, when the number ratio of secondary particles 121 in which the length T2 in a direction perpendicular to a thickness direction is longer than the length T1 in the thickness direction in a section in the thickness direction is 50% or more, or the thickness of the anode active material layer 12B at the time of discharge after repetition of the reference charge and discharge is 1.7 times or less as large as that at the time of discharge before the reference charge and discharge, higher effects can be obtained.

Moreover, when lithium is inserted into the anode active material layer 12B before initial charge and discharge, or when electrochemically active lithium remains in the anode active material layer 12B after discharge, a stress due to expansion and shrinkage according to charge and discharge can be further released, thereby the battery characteristics such as the cycle characteristics can be further improved.

Further, when the anode active material layer 12B is formed by an evaporation method at an evaporation speed of 40 nm/s or more, the adhesion between the anode active material layer 12B and the anode current collector 12A and the adhesion between the primary particles 123 in the anode active material layer 12B can be easily improved. Therefore, the secondary battery according to the embodiment can be easily manufactured.

Figure 8:
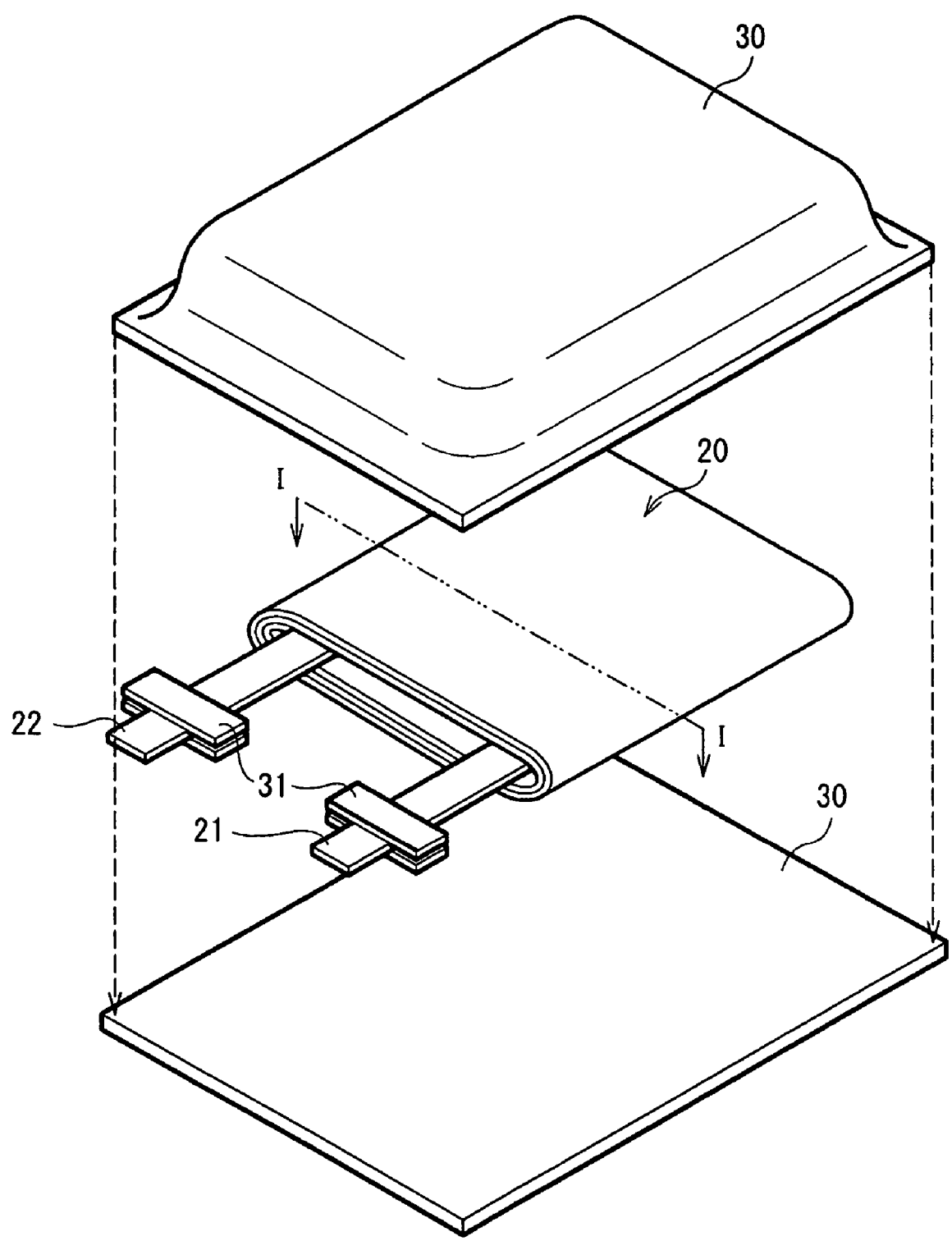
FIG. 8 is an exploded perspective view of a secondary battery according to a second embodiment of the invention.

FIG. 8 shows the structure of a secondary battery according to a second embodiment of the invention. In the secondary battery, a spirally wound electrode body 20 to which leads 21 and 22 are attached is contained in film-shaped package members 30, thereby the secondary battery can be formed with a smaller size, a lighter weight and a lower profile.

The leads 21 and 22 are drawn from the interiors of the package members 30 to outside, for example, in the same direction. The leads 21 and 22 are made of, for example, a metal material such as aluminum, copper, nickel or stainless in a sheet shape or a mesh shape.

The package members 30 are made of, for example, a rectangular aluminum laminate film including a nylon film, aluminum foil and a polyethylene film which are bonded in this order. The package members 30 are disposed so that the polyethylene film of each of the package members 30 faces the spirally wound electrode body 20, and edge portions of the package members 30 are adhered to each other by fusion bonding or an adhesive. An adhesive film 31 is inserted between the package members 30 and the leads 21 and 22 for preventing the entry of outside air. The adhesive film 31 is made of, for example, a material having adhesion to the leads 21 and 22, for example, a polyolefin resin such as polyethylene, polypropylene, modified polyethylene or modified polypropylene.

In addition, the package members 30 may be made of a laminate film with any other structure, a high molecular weight film such as polypropylene or a metal film instead of the above-described aluminum laminate film.

Figure 9:
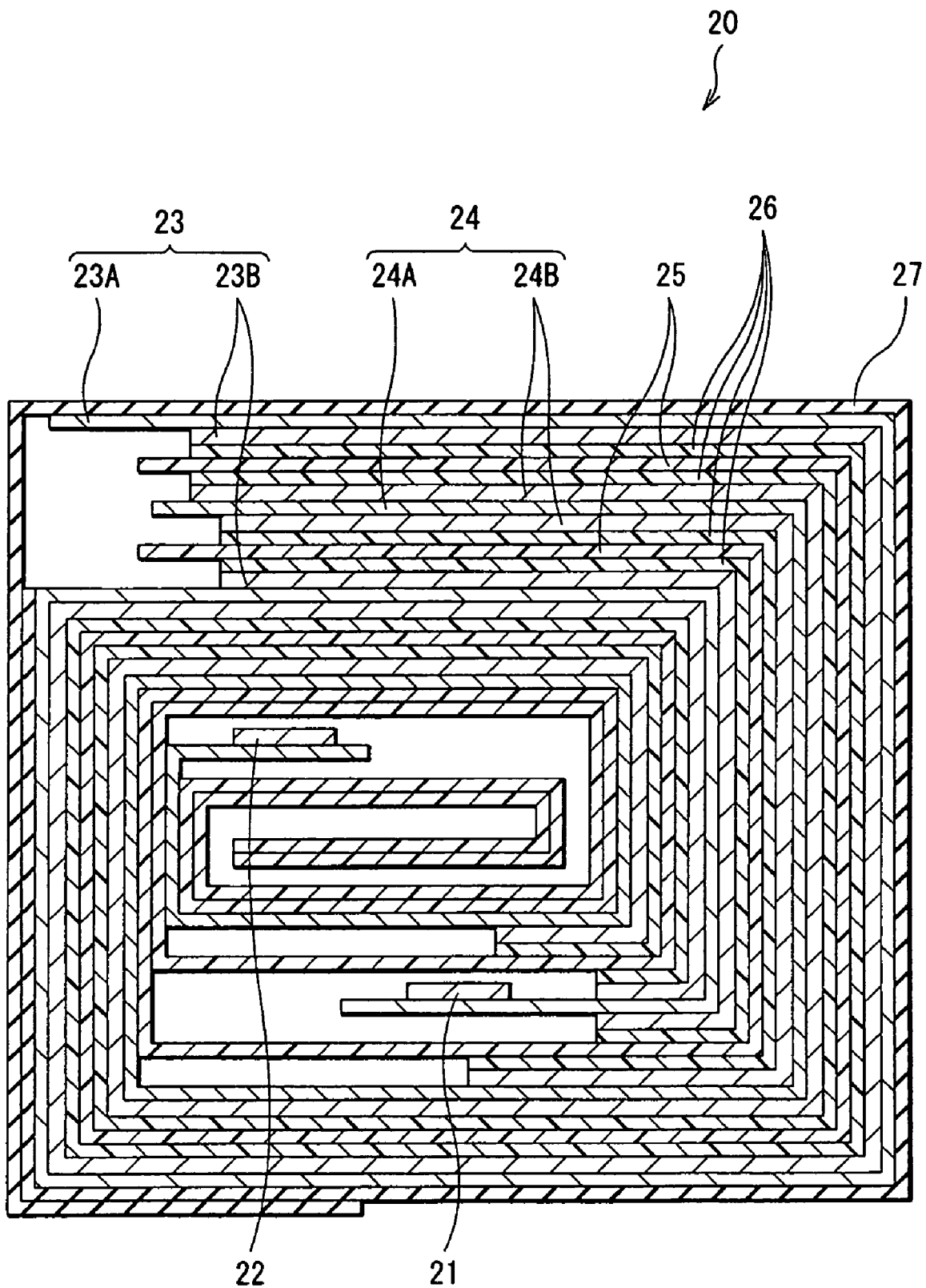
FIG. 9 is a sectional view of the secondary battery taken along a line I-I of FIG. 8.

FIG. 9 shows a sectional view of the spirally wound electrode body 20 taken along a line I-I of FIG. 8. The spirally wound electrode body 20 is a spirally wound laminate including an anode 23 and a cathode 24 with a separator 25 and an electrolyte layer 26 in between, and an outermost portion of the spirally wound electrode body 20 is protected with a protective tape 27.

The anode 23 has a structure in which an anode active material layer 23B is disposed on both sides of an anode current collector 23A. The cathode 24 has a structure in which a cathode active material layer 24B is disposed on both sides of a cathode current collector 24A, and the cathode 24 is disposed so that the cathode active material layer 24B faces the anode active material layer 23B. The structure of the anode current collector 23A, the anode active material layer 23B, the cathode current collector 24A, the cathode active material layer 24B and the separator 25 are the same as those of the anode current collector 12A, the anode active material layer 12B, the cathode current collector 14A, the cathode active material layer 14B and the separator 15, respectively. The particle structure of the anode active material layer 12B is determined through the use of a central portion of the anode active material layer 12B with a small curvature.

The electrolyte layer 26 is made of a so-called gel electrolyte in which a holding body made of a high molecular weight material holds an electrolyte solution. The gel electrolyte is preferable, because the gel electrolyte can obtain high ionic conductivity, and can prevent leakage of the battery. The structure of the electrolyte solution is the same as that in the first embodiment. As the high molecular weight material, for example, polyvinylidene fluoride is cited.

The secondary battery can be manufactured through the following steps, for example.

At first, the anode 23 and the cathode 24 are formed as in the case of the first embodiment, and the electrolyte layer 26 in which a holding body holds an electrolyte solution is formed on the anode 23 and the cathode 24. Next, the leads 21 and 22 are attached to the anode current collector 23A and the cathode current collector 24A, respectively. Then, after the anode 23 on which the electrolyte layer 26 is formed and the cathode 24 on which the electrolyte layer 26 is formed are laminated with the separator 25 in between to form a laminate, the laminate is spirally wound, and the protective tape 27 is bonded to an outermost portion of the laminate so as to form the spirally wound electrode body 20. After that, the spirally wound electrode body 20 is sandwiched between the package members 30, and edge portions of the package members 30 are adhered to each other through thermal fusion bonding or the like to seal the spirally wound electrode body 20 in the package members 30. At this time, the adhesive film 31 is inserted between the leads 21 and 22 and the package members 30.

Moreover, the battery may be assembled through the following steps. At first, as in the case of the first embodiment, after the anode 23 and the cathode 24 are formed, leads 21 and 22 are attached. Next, the anode 23 and the cathode 24 are laminated with the separator 25 in between to form a laminate, and the laminate is spirally wound. The protective tape 27 is bonded to an outermost portion of the spirally wound laminate so as to form a spirally wound body as a precursor body of the spirally wound electrode body 20. Next, the spirally wound body is sandwiched between the package members 30, and the edge portions of the package members 30 except for one side are adhered through thermal fusion bonding to form a pouched package. Then, components for an electrolyte which include the electrolyte solution, monomers as materials of a high molecular weight compound and a polymerization initiator and, if necessary, any other material such as a polymerization inhibitor are injected in the package members 30. After that, an opened portion of the package members 30 are sealed through thermal fusion bonding under a vacuum atmosphere, and the monomers are polymerized through applying heat to form the high molecular weight compound, thereby the gel electrolyte layer 26 is formed.

Thus, after assembling the battery, as in the case of the first embodiment, the battery is charged and discharged to form the above described particle structure in the anode active material layer 23B.

The secondary battery functions as in the case of the first embodiment, and has the same effects as those in the first embodiment.

A secondary battery according to a third embodiment has the same structure as that in the first embodiment, except that the structure of the anode active material layer 12B is different. Therefore, in the embodiment, referring to FIG. 1, like components are denoted by like numerals as of the first embodiment and will not be further explained.

The anode active material layer 12B includes silicon as an element, because silicon has a large ability to insert and extract lithium and can obtain a high energy density. Silicon may be included in the form of a simple substance, an alloy or a compound.

The anode active material layer 12B is formed by, for example, a vapor phase method, and includes a plurality of primary particles formed by growth in a thickness direction. A plurality of primary particles are agglomerated to form a plurality of secondary particles.

Figure 10:
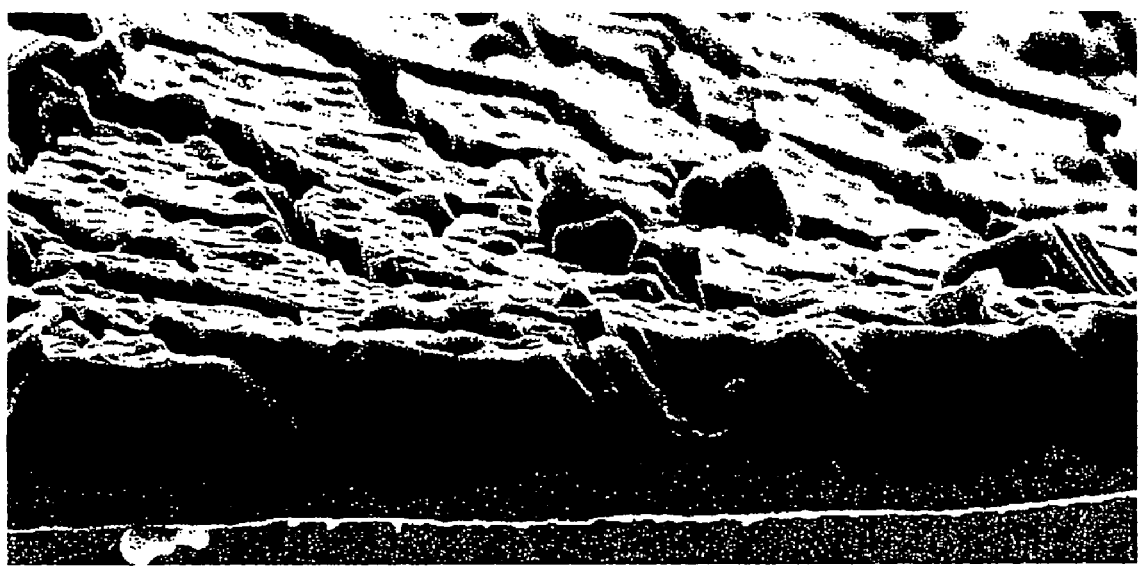
FIG. 10 is a SEM photo showing a particle structure of an anode active material layer according to a third embodiment of the invention.
Figure 11:
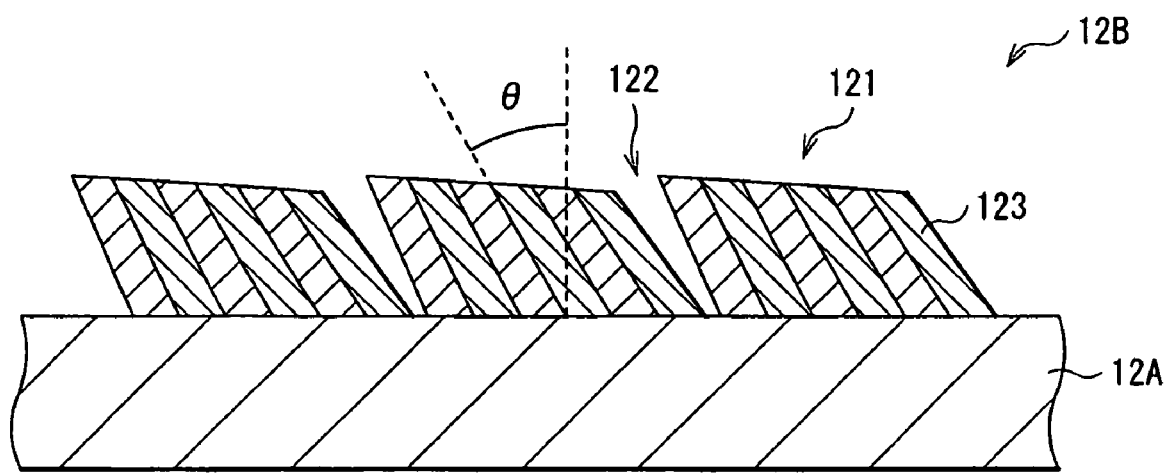
FIG. 11 is a schematic view of the particle structure of the anode active material layer shown in FIG. 10.

FIG. 10 is a SEM photo showing a particle structure of a section of the anode active material layer 12B, and FIG. 11 shows a schematic view of the particle structure. As shown in FIGS. 10 and 11, each secondary particle 121 is separated by the groove 122. The groove 122 is formed by, for example, charge and discharge, and nearly reaches the anode current collector 12A. The primary particles 123 are not only simply adjacent to one another, but also at least partially bonded to one another to form the secondary particle 121. The primary particles 123 and the secondary particles 121 are inclined to the same side from a line perpendicular to the anode current collector 12A in a section in a thickness direction. Thereby, in the secondary battery, a stress due to expansion and shrinkage according to charge and discharge can be released. Moreover, the expansion to a thickness direction can be reduced.

The primary particles 123 and the secondary particles 121 are preferably inclined at an angle θ ranging from 5° to 60° inclusive from a line perpendicular to the anode current collector 12A, and more preferably at an angle θ ranging from 15° to 60° inclusive, because within the range, higher effects can be obtained. The inclined angles of each primary particle 123 and each secondary particle 121 are not necessarily the same, and it is preferable that the average values of the angles of the primary particles 123 and the secondary particles 121 are within the above-described range. Further, the inclined angles of the primary particle 123 and the secondary particle 121 are determined through observing 5 successive secondary particles 121 in a section in a thickness direction in a central portion of the anode 12, and averaging the inclined angles of them.

For example, as shown in FIG. 10, such a particle structure may be observed by a SEM or a SIM. Moreover, the anode active material layer 12B is cut by a FIB or a microtome to observe the section.

The anode active material layer 12B is preferably alloyed with the anode current collector 12A at least at a part of an interface with the anode current collector 12A. More specifically, it is preferable that an element of the anode current collector 12A is diffused into the anode active material layer 12B, or an element of the anode active material layer 12B is diffused into the anode current collector 12A, or they are diffused into each other at an interface therebetween, because even if the anode active material layer 12B expands and shrinks according to charge and discharge, the anode active material layer 12B can be prevented from falling off the anode current collector 12A.

The secondary battery can be manufactured through the following steps, for example.

At first, the anode active material layer 12B including silicon as an element is formed on the anode current collector 12A by, for example, a vapor phase method. As the vapor phase method, for example, the vapor phase method described in the first embodiment can be used. At this time, for example, a material is injected at an angle with respect to the normal to the anode current collector 12A. Thereby, the primary particles of the anode active material layer 12B grow at an inclined angle with respect to the normal to the anode current collector 12A. Next, a heat treatment is performed under a vacuum atmosphere or a non-oxidizing atmosphere, if necessary.

Next, as in the case of the first embodiment, the cathode active material layer 14B is formed on the cathode current collector 14A, and the anode 12, the separator 15 and the cathode 14 are laminated. Then, they are put into the package cup 11 and the package can 13, and an electrolyte solution is injected. Next, the package cup 11 and the package can 13 are caulked to assemble the battery. After assembling the battery, the battery is charged and discharged to form the groove 122 in the anode active material layer 12B, thereby to separate into the secondary particles 121.

When the secondary battery is charged, lithium ions are extracted from the cathode 14, and are inserted into the anode 12 through the electrolyte solution. When the secondary battery is discharged, for example, the lithium ions are extracted from the anode 12, and are inserted into the cathode 14 through the electrolyte solution. The anode active material layer 12B largely expands and shrinks according to charge and discharge; however, the primary particles 123 and the secondary particles 121 are inclined to the same side, so a stress can be released, and the anode active material layer 12B can be prevented from losing its shape and falling off the anode current collector 12.

Thus, in the embodiment, the primary particles 123 and the secondary particles 121 of the anode active material layer 12B are inclined to the same side, so a stress due to expansion and shrinkage according to charge and discharge can be released, and the anode active material layer 12B can be prevented from losing its shape and falling off the anode current collector 12. Therefore, the battery characteristics such as the cycle characteristics can be improved.

In particular, when the primary particles 123 and the secondary particle 121 are inclined at an angle ranging from 5° to 60° inclusive from a line perpendicular to the anode current collector 12A, higher effects can be obtained.

A secondary battery according to a fourth embodiment has the same structure as that in the second embodiment, except that the anode active material layer 12B has the same structure as that in the third embodiment. In other words, in the secondary battery with the structure shown in FIGS. 8 and 9, the anode active material layer 12B has the same structure as that in the third embodiment. The secondary battery functions as in the case of the third embodiment, and has the same effects as those in the third embodiment. In particular, in the embodiment, the expansion of the anode active material layer 23B in a thickness direction can be prevented, so even if charge and discharge is repeated, the expansion of the battery can be prevented.

EXAMPLES

Specific examples of the invention will be described in detail below referring to the drawings.

Examples 1-1 to 1-7

Secondary batteries with a structure shown in FIGS. 8 and 9 were formed.

At first, fine copper particles with a particle size of approximately 2 µm were formed on a surface of copper foil by plating to prepare the anode current collector 23A with a ten point height of roughness profile Rz of approximately 2.8 µm. Next, the anode active material layer 23B made of silicon with a thickness of approximately 5.5 µm were formed on the anode current collector 23A by an electron beam vacuum evaporation method. At that time, the film forming speed was changed within a range from 0.5 nm/s to 100 nm/s in Examples 1-1 through 1-7 as shown in Table 1. Next, in Examples 1-1 through 1-3, 1-5 and 1-7, a heat treatment was performed at 300° C. under a reduced pressure atmosphere. In Examples 1-4 and 1-6, no heat treatment was performed.

Moreover, 92 parts by weight of lithium cobalt oxide ($LiCoO_2$) powder with an average particle size of 5 µm as a cathode active material, 2 parts by weight of carbon black as an electrical conductor, and 5 parts by weight of polyvinylidene fluoride as a binder were mixed to form a mixture, and the mixture was put into N-methyl-2-pyrrolidone as a dispersion medium to form slurry. Next, the slurry was applied to the cathode current collector 24A made of aluminum foil with a thickness of 15 µm, and was dried, and then the slurry was pressed to form the cathode active material layer 24B.

Next, 37.5 wt % of ethylene carbonate, 37.5% of propylene carbonate, 10 wt % of vinylene carbonate and 15 wt % of $LiPF_6$ were mixed to prepare an electrolyte solution, and a precursor solution in which 30 wt % of the electrolyte solution, 10 wt % polyvinylidene fluoride as a block copolymer with a weight-average molecular weight of 600,000 and 60 wt % of dimethyl carbonate were mixed was applied to both sides of the anode 23 and the cathode 24, and dimethyl carbonate was volatilized, thereby the electrolyte layer 26 was formed.

After that, the leads 21 and 22 were attached, and the anode 23 and the cathode 24 were laminated with the separator 26 in between, and were spirally wound. The anode 23 and the cathode 24 were sealed in the package members 30 made of an aluminum laminate film, thereby the secondary batteries were assembled.

As Comparative Examples 1-1 through 1-3 relative to Examples 1-1 through 1-7, as shown in Table 1, secondary batteries were assembled as in the case of Examples 1-1 through 1-7, except that the film forming speed of the anode active material layer 23B was changed within a range from 0.5 nm/s to 20 nm/s, and no heat treatment was performed after forming the anode active material layer 23B.

A charge-discharge test was carried out on the secondary batteries of Examples 1-1 through 1-7 and Comparative Examples 1-1 through 1-3 under a condition of 25° C. to determine a capacity retention ratio in the 101st cycle to that in the second cycle. At that time, the secondary batteries were charged at a constant current density of 1 $mA/cm^2$ until a battery voltage reached 4.2 V, and then the secondary batteries were charged at a constant voltage of 4.2 V until a current density reached 0.05 $mA/cm^2$. Next, the secondary batteries were discharged at a constant current density of 1 $mA/cm^2$ until the battery voltage reached 2.5 V. In the case where the secondary batteries were charged, the capacity utilization rate of the anode 23 was 90%, and the deposition of metal lithium on the anode 23 was prevented. The capacity retention ratio was calculated by a ratio of a discharge capacity in the 101st cycle to a discharge capacity in the second cycle, that is, (discharge capacity in the 101st cycle/discharge capacity in the second cycle)×100.

Moreover, the secondary batteries of Examples 1-1 through 1-7 and Comparative Examples 1-1 through 1-3 were charged and discharged ten times under the same conditions, and then the batteries were disassembled to take out the anode 23 in a discharge state, and the anode 23 was cleaned with dimethyl carbonate, and then a surface and a section of a central portion of the anode 23 was observed by a SIM. The central portion of the anode 23 was cut by a FIB to observe the section. Through the use of the obtained SIM photos, the average number of split particles 124 per secondary particle 121 in five adjacent secondary particles 121, the average number of secondary particles 121 per line in the case where eight 100 μm-long lines with 10-μm pitches are drawn within a range of 100 μm×70 μm, the average number of primary particles 123 per secondary particle 121, and the ratio of secondary particles in which the length T2 in a direction perpendicular to a thickness direction is longer than the length T1 in the thickness direction in ten successive secondary particles 121 were determined.

Further, in the secondary batteries of Examples 1-1 through 1-7 and Comparative Examples 1-1 through 1-3, batteries which were charged and discharged ten times under the same conditions were considered as batteries before the reference charge and discharge, and batteries which were charged and discharged ten times under the same conditions, and then further charged and discharged 40 times under the same conditions were considered as batteries after the reference charge and discharge. Each of the batteries before and after the reference charge and discharge were disassembled to take out the anode 23 in a discharge state. After that, the anode 23 was cleaned with dimethyl carbonate, and a section of a central portion of the anode 23 was observed by a SEM or a SIM. Through the use of the SEM photos or the SIM photos, the length T1 in a thickness direction of ten successive secondary particles 121 on both sides of the anode current collector 23A were measured, and the average value of them was determined as the thickness of the anode active material layer 23B, and an expansion coefficient of the anode active material layer 23B after the reference charge and discharge to before the reference charge and discharge was determined.

Figure 12:
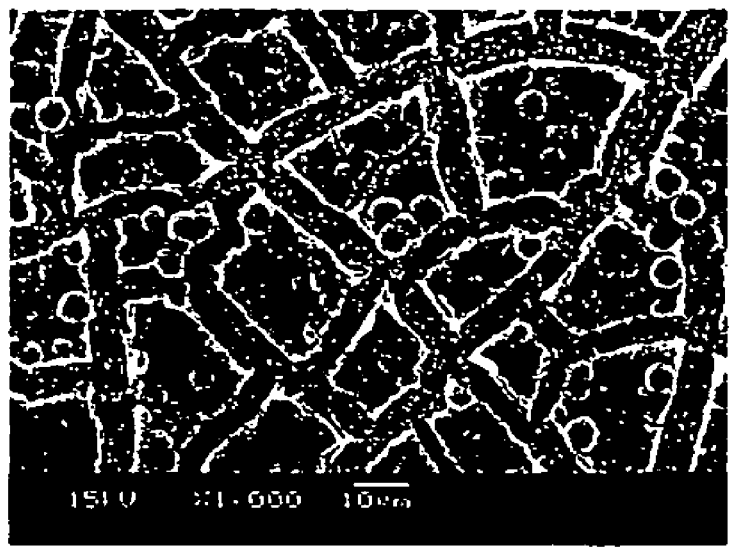
FIG. 12 is a SEM photo showing a particle structure of a surface of an anode active material layer according to Example 1-4.
Figure 13:
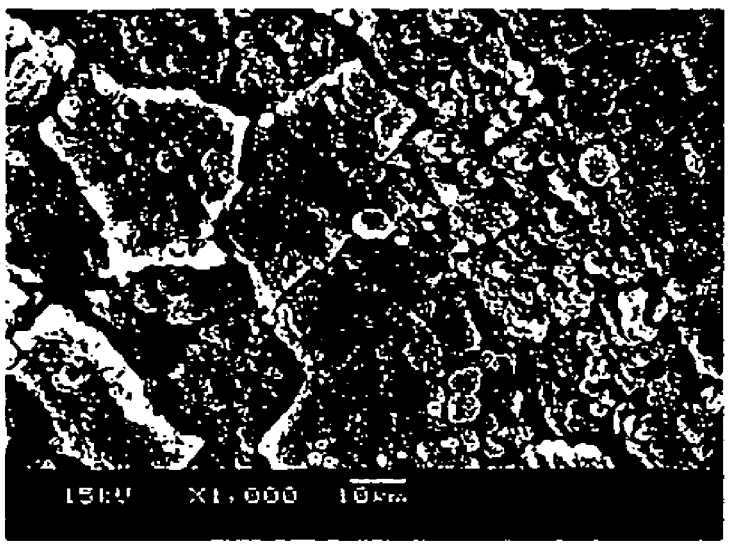
FIG. 13 is a SEM photo showing a particle structure of a surface of an anode active material layer according to Comparative Example 1-2.

These results are shown in Table 1. FIGS. 2 and 4 which have been already described are SEM photos of the anode active material layer 23B of Example 1-2, and FIG. 6 is a SIM photo of the anode active material layer 23B of Example 1-2. Further, a SEM photo of a surface of the anode active material layer 23A of Example 1-4 is shown in FIG. 12, and a SEM photo of a surface of an anode active material layer of Comparative Example 2 is shown in FIG. 13.

As shown in Table 1, in Examples 1-1 through 1-7, a higher capacity retention ratio was obtained, compared to Comparative Examples 1-1 through 1-3. Moreover, as shown in Table 1 and FIGS. 2, 4, 6 and 10, in the anode 23 of Examples 1-1 through 1-7, the average number of split particles 124 was 10 or more, and the average number of secondary particles 121 was within a range from 5 to 11 inclusive, and the average number of primary particles 123 was 20 or more, and the number ratio of the secondary particles in which the length T2 in a direction perpendicular to a thickness direction is longer than the length T1 in a thickness direction was 50% or more, and the expansion coefficient of the anode active material layer 23B was 1.7 times or less. On the other hand, in Comparative Examples 1-1 through 1-3, as shown in FIG. 13, the anode active material layer fell off, so the particle state was not able to be observed.

In other words, it was found out that when the particle state of the anode active material layer 23B was as described above, the cycle characteristics could be improved. Moreover, it was found out that such a particle state could be easily obtained through performing a heat treatment after forming the anode active material layer 23B or through forming the anode active material layer 23B by evaporation at a film forming speed of 40 nm/s or more.

Example 2

A secondary battery was assembled as in the case of Example 1-2, except that lithium was inserted into the anode active material layer 23B in advance. At that time, lithium was inserted through evaporating lithium metal onto a surface of the anode active material layer 23B after forming the anode active material layer 23B and performing a heat treatment. The amount of inserted lithium was 5% of the capacity of the anode 23. In this case, by another test performed in advance, it was confirmed that electrochemically active lithium remained in the anode 23 after discharge in early stages of a charge-discharge cycle.

The secondary battery of Example 2 was charged and discharged as in the case of Example 1-2, and the capacity retention ratio in the 101st cycle was determined, and the particle state of the anode active material layer 23B was observed in a like manner. The results are shown in Table 2 together with the results of Example 1-2.

TABLE 1

| | | | | SEM-SIM OBSERVATION | | | | | |
|---|---|---|---|---|---|---|---|---|---|
| | FILM FORMING METHOD | FILM FORMING SPEED (nm/s) | HEAT TREATMENT | AVERAGE NUMBER OF SPLIT PARTICLES | AVERAGE NUMBER OF SECONDARY PARTICLES | AVERAGE NUMBER OF PRIMARY PARTICLES | T1 < T2 50% OR MORE | EXPANSION COEFFICIENT | CAPACITY RETENTION RATIO (%) |
| EXAMPLE 1-1 | EVAPORATION | 0.5 | PERFORMED | 14 | 6.5 | 33 | ○ | 1.3 | 88 |
| EXAMPLE 1-2 | EVAPORATION | 5 | PERFORMED | 14 | 7.0 | 36 | ○ | 1.2 | 89 |
| EXAMPLE 1-3 | EVAPORATION | 20 | PERFOMRED | 17 | 5.8 | 42 | ○ | 1.2 | 86 |
| EXAMPLE 1-4 | EVAPORATION | 40 | NOT PERFORMED | 15 | 6.4 | 39 | ○ | 1.7 | 79 |
| EXAMPLE 1-5 | EVAPORATION | 40 | PERFORMED | 18 | 6.1 | 38 | ○ | 1.4 | 84 |
| EXAMPLE 1-6 | EVAPORATION | 100 | NOT PERFORMED | 13 | 6.5 | 36 | ○ | 1.3 | 84 |
| EXAMPLE 1-7 | EVAPORATION | 100 | PERFORMED | 15 | 5.9 | 35 | ○ | 1.3 | 83 |
| COMPARATIVE EXAMPLE 1-1 | EVAPORATION | 0.5 | NOT PERFORMED | — | <5 | — | — | — | 23 |
| COMPARATIVE EXAMPLE 1-2 | EVAPORATION | 5 | NOT PERFORMED | — | <5 | — | — | — | 11 |
| COMPARATIVE EXAMPLE 1-3 | EVAPORATION | 20 | NOT PERFORMED | — | <5 | — | — | — | 50 |

TABLE 2

| | Li INSERTION | AVERAGE NUMBER OF SPLIT PARTICLES | AVERAGE NUMBER OF SECONDARY PARTICLES | AVERAGE NUMBER OF PRIMARY PARTICLES | T1 < T2 50% OR MORE | EXPANSION COEFFICIENT | CAPACITY RETENTION RATIO (%) |
|---|---|---|---|---|---|---|---|
| | | SEM-SIM OBSERVATION | | | | | |
| EXAMPLE 2 | INSERTED | 17 | 5.8 | 43 | ○ | 1.1 | 92 |
| EXAMPLE 1-2 | NOT INSERTED | 14 | 7.0 | 36 | ○ | 1.2 | 89 |

As shown in Table 2, in Example 2, a higher capacity retention ratio was obtained, compared to Example 1-2. In other words, it was found out that when lithium was inserted into the anode 23 in advance, or when electrochemically active lithium remained after discharge, the cycle characteristics could be further improved.

Examples 3 and 4

In Example 3, a secondary battery was assembled as in the case of Examples 1-1 through 1-7, except that after the anode active material layer 23B was formed by a CVD method instead of a vacuum evaporation method, lithium was inserted, and a heat treatment was further performed. In Example 4, a secondary battery was assembled as in the case of Examples 1-1 through 1-7, except that after the anode active material layer 23B was formed by a sputtering method instead of a vacuum evaporation method, lithium was inserted, and a heat treatment was further performed.

As Comparative Examples 3 and 4 relative to Examples 3 and 4, secondary batteries were assembled as in the case of Examples 3 and 4, except that lithium was not inserted, and no heat treatment was performed.

Figure 14:
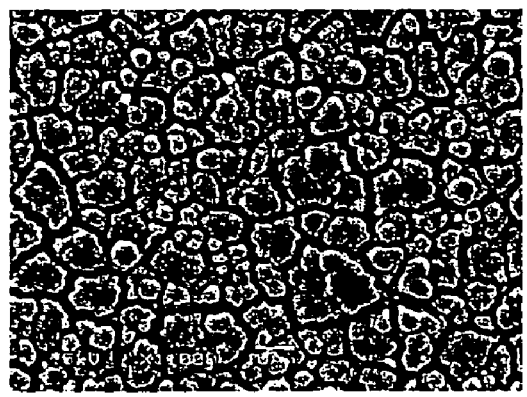
FIG. 14 is a SEM photo showing a particle structure of a surface of an anode active material layer according to Comparative Example 3.
Figure 15:
FIG. 15 is a SEM photo showing a particle structure of a section of the anode active material layer according to Comparative Example 3.
Figure 16:
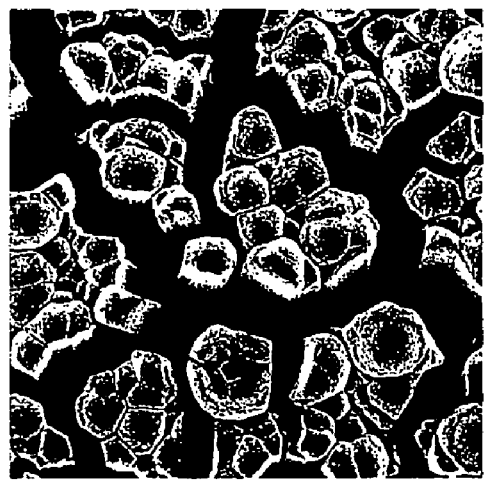
FIG. 16 is an enlarged SIM photo showing the particle structure of the surface of the anode active material layer according to Comparative Example 3.
Figure 17:
FIG. 17 is a SEM photo showing the particle structure of the surface of the anode active material layer according to Comparative Example 3.
Figure 18:
FIG. 18 is a SEM photo showing the particle structure of the section of the anode active material layer according to Comparative Example 3.
Figure 19:
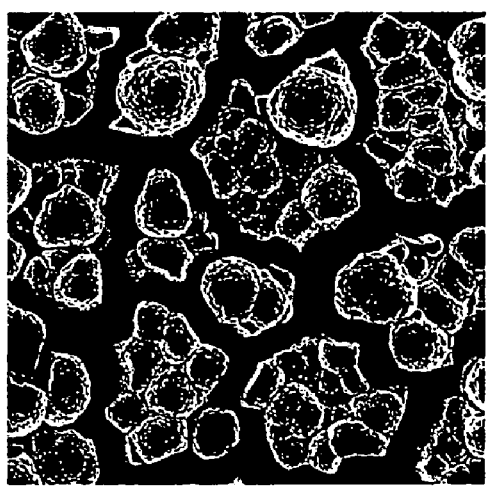
FIG. 19 is an enlarged SIM photo showing the particle structure of the surface of the anode active material layer according to Comparative Example 3.

The secondary batteries of Examples 3 and 4 and Comparative Examples 3 and 4 were charged and discharged as in the case of Examples 1-1 through 1-7, and the capacity retention ratio in the 101st cycle was determined, and the particle state of the anode active material layer 23B was observed in a like manner. The results are shown in Tables 3 and 4. SEM photos of an anode active material layer of Comparative Example 3 is shown in FIGS. 14 and 15, and a SIM photo of the anode active material layer of Comparative Example 3 is shown in FIG. 16, and SEM photos of an anode active material layer of Comparative Example 4 are shown in FIGS. 17 and 18, and a SIM photo of the anode active material layer of Comparative Example 4 is shown in FIG. 19.

TABLE 3

| | FILM FORMING METHOD | HEAT TREATMENT | Li INSERTION | AVERAGE NUMBER OF SPLIT PARTICLES | AVERAGE NUMBER OF SECONDARY PARTICLES | AVERAGE NUMBER OF PRIMARY PARTICLES | T1 < T2 50% OR MORE | EXPANSION COEFFICIENT | CAPACITY RETENTION RATIO (%) |
|---|---|---|---|---|---|---|---|---|---|
| | | | | SEM-SIM OBSERVATION | | | | | |
| EXAMPLE 3 | CVD | PERFORMED | INSERTED | 13 | 9.0 | 22 | ○ | 1.5 | 92 |
| COMPARATIVE EXAMPLE 3 | CVD | NOT PERFORMED | NOT INSERTED | 4 | 11.5 | 8 | x | 2.2 | 64 |

TABLE 4

| | FILM FORMING METHOD | HEAT TREATMENT | Li INSERTION | AVERAGE NUMBER OF SPLIT PARTICLES | AVERAGE NUMBER OF SECONDARY PARTICLES | AVERAGE NUMBER OF PRIMARY PARTICLES | T1 < T2 50% OR MORE | EXPANSION COEFFICIENT | CAPACITY RETENTION RATIO (%) |
|---|---|---|---|---|---|---|---|---|---|
| | | | | SEM-SIM OBSERVATION | | | | | |
| EXAMPLE 4 | SPUTTERING | PERFORMED | INSERTED | 11 | 92. | 27 | ○ | 1.3 | 90 |
| COMPARATIVE EXAMPLE 4 | SPUTTERING | NOT PERFORMED | NOT INSERTED | 6 | 11.3 | 8 | x | 1.8 | 74 |

As shown in Tables 3 and 4, in Examples 3 and 4, a higher capacity retention ratio was obtained, compared to Comparative Examples 3 and 4. Moreover, in the anode 23 in Examples 3 and 4, the average number of split particles 124 was 10 or more, and the average number of secondary particles 121 was within a range from 5 to 11 inclusive, and the average number of primary particles was 20 or more, and the number ratio of the secondary particle 121 in which the length T2 in a direction perpendicular to a thickness direction is longer than the length T1 in a thickness direction was 50% or more, and the expansion coefficient of the anode active material layer 23B was 1.7 times or less. On the other hand, in Comparative Examples 3 and 4, as shown in FIGS. 12 through 17, the adhesion of the primary particles was weak, and most of the secondary particles were separated into small pieces along the primary particles, and the particle state was out of the above-described range.

In other words, it was found out that even if the anode active material layer 23B was formed by another method, the particle state of the anode active material layer 23B could be formed as described above, and the cycle characteristics could be improved.

Examples 5-1 Through 5-7

Secondary batteries were assembled as in the case of Examples 1-1 through 1-7, except that the structure of the anode 23 was changed. The anode 23 was formed through forming the anode active material layer 23B made of silicon with a thickness of approximately 9 μm on the anode current collector 23A made of copper foil with a thickness of 22 μm and a rough surface by an electron beam vacuum evaporation method, and performing a heat treatment under a reduced pressure atmosphere. At that time, an angle where a material was injected onto the anode current collector 23A was changed in Examples 5-1 through 5-7.

As Comparative Example 5-1 relative to Examples 5-1 through 5-7, a secondary battery was assembled as in the case of Examples 5-1 through 5-7, except that when the anode active material layer was formed, the material was injected at an angle perpendicular to the anode current collector.

A charge-discharge test was carried out on the secondary batteries of Examples 5-1 through 5-7 and Comparative Example 5-1 under a condition of 25° C. to determine a capacity retention ratio in the 31st cycle to that in the second cycle. At that time, the secondary batteries were charged at a constant current density of 1 mA/cm² until a battery voltage reached 4.2 V, and then the secondary batteries were charged at a constant voltage of 4.2 V until a current density reached 0.05 mA/cm². Next, the secondary batteries were discharged at a constant current density of 1 mA/cm² until the battery voltage reached 2.5 V. In the case where the secondary batteries were charged, the capacity utilization rate of the anode 23 was 90%, and the deposition of metal lithium on the anode 23 was prevented. The capacity retention ratio was calculated by a ratio of a discharge capacity in the 31st cycle to a discharge capacity in the second cycle, that is, (discharge capacity in the 31st cycle/discharge capacity in the second cycle)×100.

Moreover, in the secondary batteries of Examples 5-1 through 5-7 and Comparative Example 5-1, the thickness before charge and discharge (at the time of 0 cycle) and the thickness after 31 cycles of charge and discharge were measured to determine an expansion range, and an expansion range rate to Comparative Example 5-1 was calculated by Mathematical Formula 1.

Expansion range rate=$[(A-B)/(a-b)]\times 100$  (Mathematical Formula 1)

In Mathematical Formula 1, A is the thickness of each example before charge and discharge, and B is the thickness of each example after charge and discharge, and a is the thickness of Comparative Example 5-1 before charge and discharge, and b is the thickness of Comparative Example 5-1 after charge and discharge.

Further, each secondary battery of Examples 5-1 through 5-7 and Comparative Example 5-1 was disassembled after 31st cycle to take out the anode 23 in a discharge state, and the anode 23 was cleaned with dimethyl carbonate, and then a section of a central portion of the anode 23 was observed by a SEM. The central portion of the anode 23 was cut by a microtome to observe the section. Through the use of the obtained SEM photos, in 5 successive secondary particles 121, angles θ of the primary particles 123 and the secondary particles 121 from a line perpendicular to the anode current collector 23A were measured, and the average value of them was determined.

These results are shown in Table 5. FIG. 10 which has been already described is a SEM photo of the anode active material layer 23B of Example 5-1. Further, a SEM photo of an anode active material layer of Comparative Example 5-1 is shown in FIG. 20.

TABLE 5

| | ANGLE θ (°) | EXPANSION RANGE RATE (%) | CAPACITY RETENTION RATIO (%) |
|---|---|---|---|
| EXAMPLE 5-1 | 3 | 99.8 | 85.5 |
| EXAMPLE 5-2 | 5 | 98 | 87.1 |
| EXAMPLE 5-3 | 15 | 93 | 89.2 |
| EXAMPLE 5-4 | 30 | 88 | 91.2 |
| EXAMPLE 5-5 | 45 | 86 | 92.1 |
| EXAMPLE 5-6 | 60 | 80 | 90.5 |
| EXAMPLE 5-7 | 70 | 77 | 85.3 |
| COMPARATIVE EXAMPLE 5-1 | 0 | 100 | 85.2 |

Figure 20:
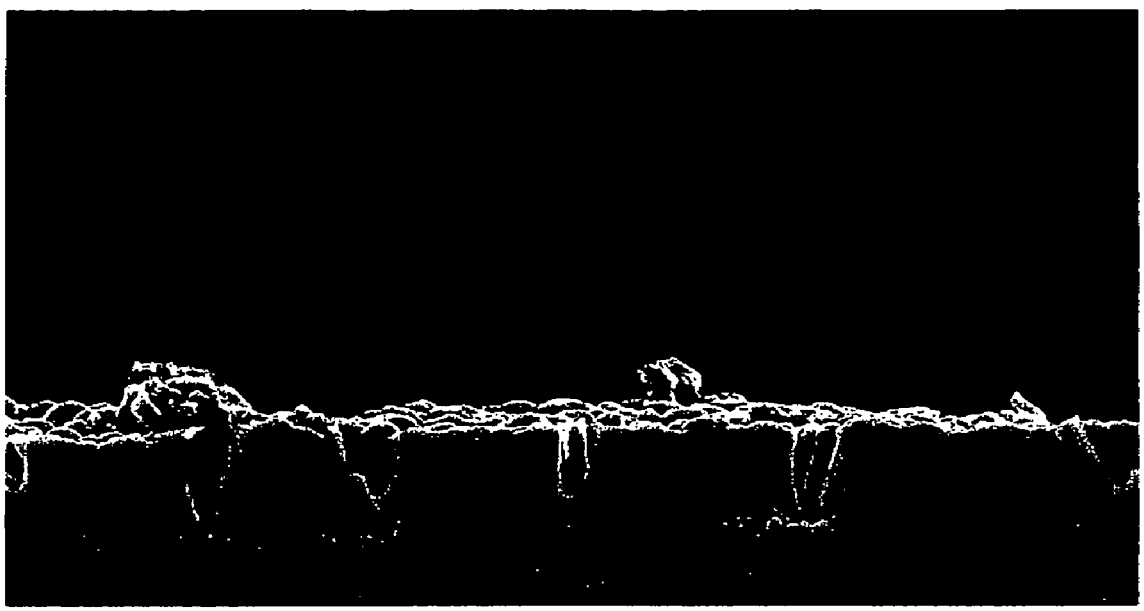
FIG. 20 is a SEM photo showing a particle structure of an anode active material layer according to Comparative Example 5-1.

As shown in Table 5 and FIGS. 10 and 20, in Examples 5-1 through 5-7, the primary particles 123 and the secondary particles 121 were inclined to the same side from a line perpendicular to the anode current collector 12A, and in Comparative Example 5-1, the primary particles 123 and the secondary particles 121 were nearly perpendicular to the anode current collector. Moreover, in Examples 5-1 through 5-7, the expansion range rate could be smaller, and the capacity retention ratio could be improved, compared to Comparative Example 5-1. In other words, it was found out that when the primary particles 123 and the secondary particles 121 were inclined to the same side, the battery characteristics such as the cycle characteristics could be improved, and the expansion coefficient of a device can be reduced.

Moreover, there was a tendency that when the angles θ of the primary particles 123 and the secondary particles 121 were larger, the capacity retention ratio was improved to the maximum value, then declined. In other words, it was found out that the primary particles 123 and the secondary particles 121 were preferably inclined at an angle ranging from 5° to 60° inclusive from a line perpendicular to the anode current collector 12A, more preferably at an angle ranging from 15° to 60° inclusive.

Although the invention is described referring to the embodiments and the examples, the invention is not limited to the embodiments and the examples, and can be variously modified. For example, in the above-described embodiments and the above-described examples, the case where an electrolyte solution which is a liquid electrolyte or a so-called gel electrolyte is used is described; however, any other electrolyte may be used. As the electrolyte, a solid electrolyte with ionic conductivity, a mixture of a solid electrolyte and an electrolyte solution or a mixture of a solid electrolyte and a gel electrolyte is cited.

As the solid electrolyte, for example, a high molecular weight solid electrolyte formed through dispersing an electrolyte salt in a high molecular weight compound with ionic conductivity, or an inorganic solid electrolyte made of ion-conductive glass or ionic crystal can be used. As the high molecular weight compound of the high molecular weight solid electrolyte, for example, an ether-based high molecular weight compound such as polyethylene oxide or a cross-link including polyethylene oxide, an ester-based high molecular weight compound such as polymethacrylate or an acrylate-based high molecular weight compound, a mixture thereof, or a copolymer thereof can be used. Moreover, as the inorganic solid electrolyte, an inorganic solid electrolyte including lithium nitride, lithium phosphate or the like can be used.

Moreover, in the above-described embodiments and the above-described examples, the invention is described referring to coin-type secondary battery and a spirally winding laminate type secondary battery; however, the invention can be applied to a secondary battery with any other shape such as a cylindrical shape, a prismatic shape, a button shape, a thin shape, a large shape or a laminate shape in a like manner. In addition, the invention can be applied to not only secondary batteries but also primary batteries.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed is:

1. A battery, comprising: a cathode; an anode; and an electrolyte, wherein the anode includes an anode active material layer formed directly on an anode current collector, the anode active material layer including silicon, the anode active material layer includes a particle state including a plurality of secondary particles formed through agglomerating a plurality of primary particles, each secondary particle is separated by a groove with a depth in a thickness direction of the anode active material layer in an in-plane direction of the anode active material layer, a portion of the primary particles are split particles split by the groove, and at least in a part of the anode active material layer, the average number of the split particles per secondary particle in 5 or more adjacent secondary particles is 10 or more, wherein the battery has a capacity retention ratio that is 79% or greater.

2. A battery according to claim 1, wherein the number ratio of secondary particles in which a length in a direction perpendicular to a thickness direction is longer than a length in the thickness direction is 50% or more in 10 successive secondary particles.

3. A battery according to claim 1, wherein in the case where 40 cycles of charge and discharge is reference charge and discharge, the thickness of the anode active material layer at the time of discharge after repetition of the reference charge and discharge is 1.7 times or less as large as that at the time of discharge before the reference charge and discharge.

4. A battery according to claim 1, wherein lithium is inserted into the anode active material layer before initial charge and discharge.

5. A battery according to claim 4, wherein electrochemically active lithium remains in the anode active material layer after discharge.

6. A battery, comprising: a cathode; an anode; and an electrolyte, wherein the anode includes an anode active material layer formed directly on an anode current collector, the anode active material layer including silicon, the anode active material layer includes a particle state including a plurality of secondary particles formed through agglomerating a plurality of primary particles, wherein eight 100 μm-long lines with 10-μm pitches are drawn within a range of 100 μm×70 μm in at least a part of the anode active material layer such that the average number of secondary particles per line is within a range from 5 to 11 inclusive, and the average number of primary particles per secondary particle on the line is 20 or more, wherein the battery has a capacity retention ratio that is 79% or greater.

7. A battery according to claim 6, wherein the number ratio of secondary particles in which a length in a direction perpendicular to a thickness direction is longer than a length in the thickness direction is 50% or more in 10 successive secondary particles.

8. A battery according to claim 6, wherein 40 cycles of charge and discharge is reference charge and discharge such that the thickness of the anode active material layer at the time of discharge after repetition of the reference charge and discharge is 1.7 times or less as large as that at the time of discharge before the reference charge and discharge.

9. A battery according to claim 6, wherein lithium is inserted into the anode active material before initial charge and discharge.

10. A battery according to claim 9, wherein electrochemically active lithium remains in the anode active material layer after discharge.

11. The battery of claim 1, wherein the particle state is formed by evaporation at a film forming speed of 40 nm/s or more or is formed by heat treatment after forming the anode active material layer.

12. The battery of claim 6, wherein the particle state is formed by evaporation at a film forming speed of 40 nm/s or more or is formed by heat treatment after forming the anode active material layer.

* * * * *